Patented Dec. 31, 1935

2,025,991

UNITED STATES PATENT OFFICE 2,025,991

AZO DYESTUFFS AND THEIR PRODUCTION

Max Albert Kunz, Mannheim, Gerd Kochendoerfer, Ludwigshafen-on-the-Rhine, Kuno Maurach, Bad Durkheim, and Walter Limbacher, Ludwigshafen-on-the-Rhine, Germany, assignors to General Aniline Works, Inc., New York, N. Y., a corporation of Delaware No Drawing. Application June 23, 1934, Serial No. 732,176. In Germany February 24, 1932

5 Claims. (Cl. 260—38.5)

The present invention relates to azo dyestuffs and a process of producing same.

We have found that valuable azo dyestuffs are obtained by coupling diazo compounds with a monohydroxypyridinonaphthalene (which term is intended to include the monohydroxypyridinonaphthalenes themselves and their derivatives containing one hydroxy group), the components being selected so that the resulting dyestuff is capable of forming complex metal compounds and contains at least one sulphonic acid group in the molecule and, if desired, treating the dyestuff with an agent supplying a metal. The preparation of the dyestuffs is effected for example by coupling one molecular proportion of a diazo compound with one molecular proportion of a monohydroxypyridinonaphthalene or by coupling one molecular proportion of a tetrazo compound with two molecular proportions of a monohydroxypyridinonaphthalene, wherein either the diazo (or tetrazo) compounds or the monohydroxypyridinonaphthalenes used or both components contain at least one sulphonic acid group and the components are selected so that the resulting dyestuffs are capable of forming complex metal compounds.

Diazo compounds which when coupled with a monohydroxypyridinonaphthalene yield dyestuffs capable of forming complex metal compounds, are for example, those containing in ortho-position to the diazo group a hydroxyl or a carboxylic group or in ortho-position to each other a hydroxyl and a carboxylic group. If diazo compounds are used which contain a hydroxyl or a carboxylic group in ortho-position to the diazo group, such monohydroxypyridinonaphthalenes are employed as coupling components as couple in ortho-position to the hydroxyl group.

Monohydroxylated 1(N),2-, 2(N),1- and 2(N),3-pyridinonaphthalenes and their substitution products may be used as coupling components. As suitable monohydroxypyridinonaphthalenes may be mentioned for example 4-hydroxy-1(N),2-pyridinonaphthalene, 3-hydroxy-1(N),2-pyridinonaphthalene, 6-hydroxy-2(N),1-pyridinonaphthalene, 6-hydroxy-Py2-methyl-1(N),2-pyridinonaphthalene, 8-hydroxy-2(N),1-pyridinonaphthalene-6-sulphonic acid and 5-hydroxy-2(N),1-pyridinonaphthalene-7-sulphonic acid. The monohydroxypyridinonaphthalenes may be prepared for example from the pyridinonaphthalene sulphonic acids obtainable according to application Ser. No. 583,144 by fusion with caustic alkalies. The said hydroxypyridinonaphthalene sulphonic acids may be prepared from the corresponding aminohydroxynaphthalene sulphonic acids for example according to the method of Skraup.

Dyestuffs prepared according to the present invention, when treated on the fibre with agents supplying metals, for example iron, copper and chromium compounds, yield valuable complex metal compounds. Especially valuable dyeings are obtained by dyeing animal fibre such as wool with the said dyestuffs and subjecting the dyeing to an after-chroming treatment or by dyeing on chrome-mordanted wool. The dyeings possess excellent fastness properties, especially as regards fastness to light, to washing and fulling. The shades of the said dyeings are usually from violet to blue to black.

Some of the dyestuffs furnish very valuable complex metal compounds also when treated in substance with compounds supplying metals, for example with chroming agents.

The present application is a continuation-in-part of application Ser. No. 657,150.

The following examples will further illustrate the nature of the present invention but the invention is not restricted to these examples. The parts are by weight.

Example 1

23.4 parts of 4-nitro-2-amino-1-hydroxybenzene-6-sulphonic acid are diazotized in the usual manner and coupled with a caustic alkaline solution of 21.4 parts of 4-hydroxy-1(N),2-pyridinonaphthalene containing an excess of sodium carbonate. A dyestuff is obtained which dyes wool Bordeaux red shades and yields brown violet dyeings upon after-treating the wool with bichromate or when dyed on chrome-mordanted wool. The dyestuff may be chromed as such and the chrome compounds thus obtained may be employed for dyeing wool. The dyestuff corresponds to the following formula:

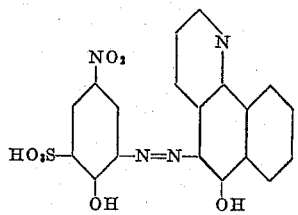

Example 2

The diazo compound obtained by diazotizing 23.4 parts of 6-nitro-2-amino-1-hydroxybenzene-4-sulphonic acid is coupled with a caustic alkaline solution of 21.4 parts of 4-hydroxy-1(N),2-pyridinonaphthalene containing an excess of sodium carbonate. The dyestuff obtained is worked up in the usual manner and dried. It dyes wool violet shades; by after-treating the dyeing with bichromate blue shades are obtained which possess excellent fastness properties, especially as regards fastness to washing, fulling and light.

Similar blue shades are produced by after-chroming dyeings which have been obtained with dyestuffs prepared in an analogous manner as described in the preceding paragraph while replacing 6-nitro-2-amino-1-hydroxybenzene-4-sulphonic acid by 4-chloro-2-amino-1-hydroxybenzene-6-sulphonic acid or by 3-amino-4-hydroxy-1-methylbenzene-5-sulphonic acid.

*Example 3*

23.3 parts of 5-amino-2-hydroxy-3-sulphobenzene-1-carboxylic acid are diazotized in the usual manner and coupled with a caustic alkaline solution of 21.4 parts of 4-hydroxy-1(N),2-pyridinonaphthalene containing an excess of sodium carbonate. The dyestuff obtained dyes wool red shades; by after-treating the dyeing with bichromate fast red violet shades are obtained.

A dyestuff yielding dyeings of similar shades is obtained when using 3-amino-2-hydroxy-5-sulphobenzene-1-carboxylic acid instead of 5-amino-2-hydroxy-3-sulphobenzene-1-carboxylic acid.

*Example 4*

21.7 parts of 2-amino-5-sulphobenzene-1-carboxylic acid are diazotized in the usual manner and the solution obtained is allowed to flow into a caustic alkaline solution of 21.4 parts of 4-hydroxy-1(N),2-pyridinonaphthalene containing an excess of sodium carbonate. A dyestuff is obtained dyeing wool orange shades which by after-treatment with bichromate change to brown shades of good fastness.

*Example 5*

The diazo compound obtained by diazotizing 23.4 parts of 4-nitro-2-amino-1-hydroxybenzene-6-sulphonic acid is coupled with a caustic alkaline solution of 21.4 parts of 3-hydroxy-1(N),2-pyridinonaphthalene containing an excess of sodium carbonate. The dyestuff obtained dies wool violet brown shades which by after-treatment with bichromate change to black shades of very good fastness to washing, fulling and light.

By replacing 4-nitro-2-amino-1-hydroxybenzene-6-sulphonic acid by 6-nitro-2-amino-1-hydroxybenzene-4-sulphonic acid or 4-chloro-2-amino-1-hydroxybenzene-6-sulphonic acid or 3-amino-4-hydroxy-1-methylbenzene-5-sulphonic acid, dyestuffs are obtained which yield dyeings which upon after-treatment with bichromate give blue shades very fast to washing and fulling.

*Example 6*

The diazo compound obtainable from 23.3 parts of 5-amino-2-hydroxy-3-sulphobenzene-1-carboxylic acid is coupled with a caustic alkaline solution of 21.4 parts of 3-hydroxy-1(N),2-pyridinonaphthalene containing an excess of sodium carbonate. A dyestuff is obtained dyeing wool red shades which upon after-treatment with bichromate change to violet shades of good fastness.

A dyestuff yielding similar shades is obtained by replacing 5-amino-2-hydroxy-3-sulphobenzene-1-carboxylic acid by 3-amino-2-hydroxy-5-sulphobenzene-1-carboxylic acid.

*Example 7*

18.8 parts of 4-nitro-6-chloro-2-amino-1-hydroxybenzene are diazotized in the usual manner and the solution obtained is allowed to flow into a solution of 30.2 parts of 8-hydroxy-2-(N),1-pyridinonaphthalene-6-sulphonic acid in aqueous sodium carbonate containing an excess of caustic alkali. The dyestuff obtained dyes wool black shades. By after-treating the latter with bichromate black dyeings of very good fastness to washing and fulling are obtained.

A dyestuff dyeing wool similar shades may be prepared by replacing 8-hydroxy-2(N),1-pyridinonaphthalene-6-sulphonic acid by 5-hydroxy-2-(N),1-pyridinonaphthalene-7-sulphonic acid.

If, however, 4,6-dichloro-2-amino-1-hydroxybenzene is used as diazo component and 8-hydroxy - 2(N),1-pyridinonaphthalene-6-sulphonic acid as coupling component, a dyestuff is obtained which by after-treatment with bichromate yields fast blue shades.

*Example 8*

23.4 parts of 6-nitro-2-amino-1-hydroxybenzene-4-sulphonic acid are diazotized as usual and coupled with a caustic alkaline solution of 22.9 parts of 6-hydroxy-Py2-methyl-1(N),2-pyridinonaphthalene containing an excess of sodium carbonate. A dyestuff is obtained dyeing wool blue shades which by after-treatment with bichromate change to violet.

A dyestuff dyeing wool similar shades is obtained by using 6-hydroxy-2(N),1-pyridinonaphthalene instead of 6-hydroxy-Py2-methyl-1(N),2-pyridinonaphthalene.

What we claim is:—

1. The process of producing azo dyestuffs capable of forming complex metal compounds which comprises coupling an aromatic diazo compound with a monohydroxypyridinonaphthalene, the hydroxy group of which being attached to the naphthalene nucleus, the components being so selected that the resulting dyestuff is capable of forming complex metal compounds and contains at least one sulphonic acid group.

2. Azo dyestuffs capable of forming complex metal compounds containing at least one sulphonic acid group in the molecule and containing as a coupling component a monohydroxypyridinonaphthalene, the hydroxy group of which being attached to the naphthalene nucleus.

3. The azo dyestuff corresponding to the formula

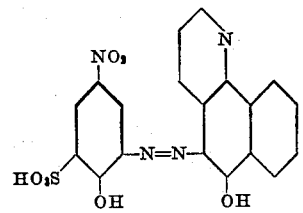

4. The azo dyestuff corresponding to the formula

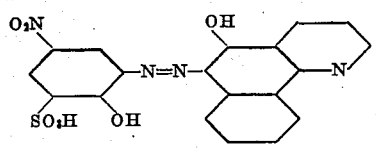

5. The azo dyestuff corresponding to the formula

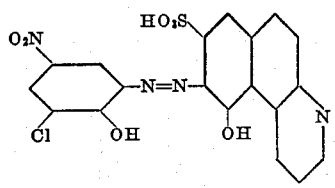

MAX ALBERT KUNZ.
GERD KOCHENDOERFER.
KUNO MAURACH.
WALTER LIMBACHER.